United States Patent
Hahn

(10) Patent No.: US 12,203,419 B2
(45) Date of Patent: Jan. 21, 2025

(54) SYSTEM AND METHOD FOR IN SITU VERIFICATION OF REDUNDANT ELECTRO-HYDRAULIC SERVO VALVE (EHSV) OPERATIONAL STATUS IN REDUNDANT FLOW CONTROL SYSTEMS

(71) Applicant: Michael L. Hahn, Fort Collins, CO (US)

(72) Inventor: Michael L. Hahn, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 126 days.

(21) Appl. No.: 18/071,201

(22) Filed: Nov. 29, 2022

(65) Prior Publication Data

US 2024/0175399 A1  May 30, 2024

(51) Int. Cl.
  *F02C 9/26* (2006.01)
  *F02C 7/22* (2006.01)
  *F02C 9/46* (2006.01)
  *F16K 37/00* (2006.01)

(52) U.S. Cl.
  CPC ............... *F02C 9/263* (2013.01); *F02C 7/22* (2013.01); *F02C 9/46* (2013.01); *F16K 37/0075* (2013.01); *F05D 2260/80* (2013.01); *F05D 2260/83* (2013.01); *F05D 2260/84* (2013.01); *F05D 2270/56* (2013.01); *F05D 2270/70* (2013.01)

(58) Field of Classification Search
  CPC .... F02C 9/263; F02C 9/46; F02C 7/22; F16K 37/0075; F05D 2260/84; F05D 2260/80; F05D 2260/83; F05D 2270/56; F05D 2270/70; Y10T 137/8158

USPC ......................................................... 137/551
See application file for complete search history.

(56) References Cited

U.S. PATENT DOCUMENTS

| | | | | |
|---|---|---|---|---|
| 4,716,723 A | * | 1/1988 | Ralston | F02C 9/28 60/39.281 |
| 5,111,653 A | * | 5/1992 | Leeson | F02C 7/232 60/734 |
| 5,845,484 A | * | 12/1998 | Maker | F02C 7/228 60/739 |
| 6,381,946 B1 | * | 5/2002 | Wernberg | F02C 9/263 60/39.281 |
| 7,096,658 B2 | | 8/2006 | Wernberg et al. | |
| 7,337,761 B2 | * | 3/2008 | Bickley | F02C 7/232 60/734 |
| 7,966,994 B2 | * | 6/2011 | Kleckler | F02C 7/236 123/510 |
| 8,869,825 B2 | * | 10/2014 | Sugata | G05D 7/0635 137/488 |
| 9,316,157 B2 | * | 4/2016 | Ripley | F02C 7/32 |
| 9,353,688 B2 | * | 5/2016 | Futa | F02C 7/22 |

(Continued)

*Primary Examiner* — William M McCalister
(74) *Attorney, Agent, or Firm* — Reinhart Boerner Van Deuren P.C.

(57) ABSTRACT

A system and method of in situ verification of operational status of control components in a redundant flow control system is provided. The flow control system includes a primary electro-hydraulic servo valve (EHSV) and a secondary EHSV. Only the primary EHSV includes a position sensor. The redundant EHSVs are coupled via a transfer valve to control a position of a metering valve supplying fluid flow to at least one downstream system. The downstream system may be, e.g., a combustor, an actuator, an end effector, or a combination thereof.

26 Claims, 2 Drawing Sheets

(56) References Cited

U.S. PATENT DOCUMENTS

| | | | |
|---|---|---|---|
| 10,041,497 B2* | 8/2018 | Nyzen | F02C 7/236 |
| 10,428,742 B2* | 10/2019 | van Alen | F02C 9/32 |
| 10,451,053 B2* | 10/2019 | Nyzen | F04B 49/08 |
| 11,187,229 B2* | 11/2021 | Rhoden | F04C 2/084 |
| 2003/0140625 A1* | 7/2003 | Spickard | F02C 9/285 |
| | | | 60/403 |
| 2004/0025492 A1* | 2/2004 | Griffiths | F02C 9/34 |
| | | | 60/39.281 |
| 2009/0000672 A1 | 1/2009 | Goll | |
| 2012/0159953 A1* | 6/2012 | Griffiths | F02C 9/263 |
| | | | 60/734 |
| 2017/0292457 A1* | 10/2017 | Selstad | F02C 9/44 |
| 2018/0246012 A1 | 8/2018 | Martucci et al. | |
| 2020/0123986 A1* | 4/2020 | Hahn | G05D 7/0126 |
| 2020/0224594 A1* | 7/2020 | Selstad | G01M 15/14 |
| 2023/0022254 A1* | 1/2023 | Kao | G05D 16/2024 |

* cited by examiner

SYSTEM AND METHOD FOR IN SITU VERIFICATION OF REDUNDANT ELECTRO-HYDRAULIC SERVO VALVE (EHSV) OPERATIONAL STATUS IN REDUNDANT FLOW CONTROL SYSTEMS

FIELD OF THE INVENTION

This invention generally relates to redundant flow control systems for aerospace applications, and more particularly to systems and methods of in situ verification of the operations status thereof.

BACKGROUND OF THE INVENTION

Reduction in adverse system impact from component failures and the ability for continued operation with such failures are important design considerations in many industries, and are particularly so for aerospace applications. As such, and depending on the level of criticality of the particular system for continued safe operation, engineers carefully include redundancy in critical components in such system designs and perform failure modes and effects analyses during such design phases to assess the potential impact of such failures.

While such considerations during the design process and inclusion of redundant critical components and systems are effective at reducing the disruption to system operation upon the occurrence of a component failure during operation, for many systems it is also important to ensure that these systems, primary and backup, are operational prior to placing them in service. Indeed, for some systems, detection of possible or impending failure is desirable during operation of the system so that such disruptions may be avoided altogether. For such systems engineers often include built-in test (BIT) circuitry and/or logic in their designs. Such BIT circuitry and/or logic may perform a system test to ensure operational integrity upon power up, and often monitors system operation thereafter to alert personnel and/or adjust operation if a failure is detected thereafter.

One problem with the inclusion of BIT circuitry, particularly for aerospace applications, is that the additional circuitry and sensors add additional weight and require additional space to and for the systems. Because each additional pound on an aircraft increases fuel burn and reduces cargo capacity, there is a need for engineers to keep the overall system weight and size as low as possible. To avoid inclusion of additional sensors, some industries implement BIT by exercising the actual system components to ensure operational status.

Unfortunately, exercising actual system components to test their operational status is not possible for some aerospace systems, particularly those that relate to fuel control to the engines. This is because exercising such system components could result in actual fuel flow to the combustor of the engine preflight. Also, because such fuel systems often are used to provide the hydraulic pressure to position certain actuators and end effectors on the aircraft, e.g., flight control surfaces, exercising such components could also cause actuation and movement of such actuators and end effectors which may be undesirable due to possible presence of maintenance or flight personnel.

Indeed, a typical multi-stage gas turbine engine fuel system, such as that described in U.S. Pat. No. 7,096,658 to Wernberg et al., entitled Centrifugal Pump Fuel System and Method for Gas Turbine Engine (hereinafter the "'658 patent"), and assigned to the assignee of the present application, the teachings and disclosure of which are incorporated herein in their entireties by reference thereto, utilizes a single Fuel Metering Unit (FMU) to meter fuel flow to the combustor of the engine, e.g., to power an aircraft. The FMU typically includes a single prime reliable fuel metering valve (FMV). This FMV may include a dual channel linear variable displacement transducer (LVDT) to provide feedback of the fuel metering valve position for both control and BIT monitoring during operation. The Full Authority Digital Electronic Controller (FADEC) uses the position of the FMV to regulate the metered fuel flow. The FADEC positions the FMV by supplying an electrical signal to the Electro-Hydraulic Servo Valve (EHSV) that provide the hydraulic muscle to adjust the FMV to the desired position.

In order to provide the redundancy of the fuel control as discussed above, main fuel metering systems utilize redundant EHSVs for control of the FMV of the FMU. In order to provide such redundancy, a transfer system including a transfer valve is included to allow the FADEC to select which of the two redundant EHSVs to use to control the FMV. In the event of a failure of the controlling EHSV, the FADEC can signal the transfer system to switch control via the transfer valve to the second EHSV, thus maintaining control of the FMV for continued fuel flow to the engine and to the actuators/end effectors powered thereby.

In view of the critical control function provided by these redundant EHSVs, their functionality preflight, and monitoring of continued operation during flight, is important. While position sensor for the primary EHSV used by the FADEC monitors operation of the primary EHSV during flight, such could not ensure operational status preflight (due to the potential of supplying fuel to the combustor and movement of the actuators/end effectors if exercised). Nor could such LVDT be used to determine operational status of the redundant EHSV. A second LVDT could be added to this redundant EHSV for monitoring during flight and for exercising preflight to check its operational status. However, the added weight and envelope required for such additional sensor is disadvantageous, particularly since the fuel control system is designed hopefully never to use this redundant EHSV. Nonetheless, in view of the criticality of such redundant fuel control system components, operational status of each EHSV is desired.

What is needed, therefore, is a system and method for in situ preflight BIT verification of the operation status of the redundant FMV EHSVs to ensure prime reliability of the combustor metering system and/or actuation system, but that does not add undesirable cost, weight, size, and complexity. Embodiments of the present invention provide such a system and method. These and other advantages of the invention, as well as additional inventive features, will be apparent from the description of the invention provided herein.

BRIEF SUMMARY OF THE INVENTION

In view of the above, embodiments of the present invention provide a new and improved system and method of verifying operational status of redundant EHSVs in a fuel control system for a gas turbine engine. More particularly, embodiments of the present invention provide a new and improved system and method of in situ, preflight, verification of the operational status of redundant EHSVs in a fuel control system for a gas turbine engine.

Such embodiments do not add undesirable cost, weight, size, and/or complexity to the system by requiring position or other sensors not needed for operational control. Embodiments of the present invention provide such a system and method without potential for preflight supply of fuel to the combustor or actuation of end effectors during such operational verification.

In one embodiment, a method of in situ verification of operational status of control components in a redundant flow control system having a primary EHSV and a secondary EHSV coupled via a transfer valve to control a position of a metering valve supplying fluid flow to at least one downstream system is provided. Such method includes the steps of commanding the transfer valve to couple the secondary EHSV to the metering valve. Thereafter the method determines if the downstream system changed from a quiescent state after commanding the transfer valve to couple the secondary EHSV to the metering valve. When the step of determining if the downstream system changed from the quiescent state is negative, the method commands the primary EHSV to move.

If the primary EHSV moves after the step of commanding the primary EHSV to move in this embodiment, the method commands the transfer valve to couple the primary EHSV to the metering valve and commands the secondary EHSV to move. If the at least one downstream system did not change from the quiescent state after the step of commanding the secondary EHSV to move, then the method provides an indication of the operational status of the control components in the redundant flow control system.

In a further embodiment, the method further includes the step of indicating a failure when the step of determining if the downstream system changed from the quiescent state is positive. A further method indicates a failure when the step of determining if the primary EHSV moved after the step of commanding the primary EHSV to move is negative. A yet further method indicates a failure when the step of determining if the at least one downstream system changed from the quiescent state after the step of commanding the secondary EHSV to move is positive.

In a further embodiment, the method includes the steps of determining if the downstream system changed from the quiescent state after the step of commanding the primary EHSV to move, and indicating a failure when the step of determining if the downstream system changed from the quiescent state after the step of commanding the primary EHSV to move is positive. In another embodiment, when the step of determining if the downstream system changed from the quiescent state after the step of commanding the primary EHSV to move is negative and the step of determining if the primary EHSV moved after the step of commanding the primary EHSV to move is positive, the method verifies that the transfer valve is operational.

In another embodiment the method also includes the step of verifying operation of a closed loop holding of a quiescent state of the downstream system when the step of determining if the downstream system changed from the quiescent state is negative. A method also includes the step of verifying operation of the primary EHSV and tracking of a position of the primary EHSV when the step of determining if the primary EHSV moved after the step of commanding the primary EHSV to move is positive. A further method verifies operation of the transfer valve when the step of determining if the downstream system changed from the quiescent state after the step of commanding the secondary EHSV to move is negative.

In another embodiment, a redundant flow control system is provided. This system includes control components including a primary electro-hydraulic servo valve (EHSV) and a secondary EHSV. A metering valve supplying fluid flow to a downstream system is also included. A transfer valve that is configured to couple one of either the primary EHSV and the secondary EHSV to the metering valve to control a position thereof is included in the system. Finally, a controller is included that is configured to provide in situ verification of operational status of at least the control components.

In one embodiment of the system, the controller is configured to command the transfer valve to couple the secondary EHSV to the metering valve, to determine if the downstream system changed from a quiescent state after commanding the transfer valve to couple the secondary EHSV to the metering valve, and when determining if the downstream system changed from the quiescent state is negative, to command the primary EHSV to move, to determine if the primary EHSV moved after commanding the primary EHSV to move, and when determining if the primary EHSV moved is positive, to command the transfer valve to couple the primary EHSV to the metering valve, to command the secondary EHSV to move, to determine if the downstream system changed from the quiescent state after commanding the secondary EHSV to move, and when determining if the at least one downstream system changed from the quiescent state after commanding the secondary EHSV to move is negative, to provide an indication of the operational status of the control components in the redundant flow control system.

In an embodiment the controller is configured to indicate a failure when determining if the at least one downstream system changed from the quiescent state is positive. In another embodiment the controller is configured to indicate a failure when determining if the primary EHSV moved after commanding the primary EHSV to move is negative. In a further embodiment, the controller is configured to indicate a failure when determining if the downstream system changed from the quiescent state after commanding the secondary EHSV to move is positive.

In a yet further embodiment, the controller is configured to determine if the downstream system changed from the quiescent state after commanding the primary EHSV to move, and to indicate a failure when determining if the at least one downstream system changed from the quiescent state after commanding the primary EHSV to move is positive. Still further, in an embodiment the controller is configured to verify that the transfer valve is operational after determining if the at least one downstream system changed from the quiescent state after commanding the primary EHSV to move is negative and determining if the primary EHSV moved after commanding the primary EHSV to move is positive.

In another embodiment the controller is configured to verify operation of a closed loop holding of a quiescent state of the at least one downstream system when determining if the at least one downstream system changed from the quiescent state is negative. In a further embodiment, the controller is configured to verify operation of the primary EHSV and tracking of a position of the primary EHSV when determining if the primary EHSV moved after commanding the primary EHSV to move is positive. In a yet further embodiment, the controller is configured to verify operation of the transfer valve when determining if the at least one downstream system changed from the quiescent state after commanding the secondary EHSV to move is negative.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, there is illustrated an embodiment of a system and method of in situ determination of operational status of key control components of a redundant fluid flow control system, e.g., a fuel flow control system for a combustor of a turbine engine, a hydraulic flow control system for an actuator and/or end effector for a control surface of an aircraft, a hydraulically actuated door, etc. While such redundant fluid flow control systems may be used for such individual applications, embodiments of the present invention are also applicable to combinations thereof, e.g., wherein fuel is used both to fuel the engine and to provide the hydraulic pressure to control actuation, particularly for aerospace applications. As used herein, "in situ" refers to the use of only the sensors necessary for normal operation of the flow control system, and while the control components are in an operational installation capable of affecting and effectuating operation of other components and systems on the aircraft.

While such systems and methods provide particular advantages in such operating environments, especially in view of the size, weight, and envelope restrictions common therein, other embodiments of the present invention may be used in other operating environments that require redundant control components that are not easily or desirably exercised prior to system operation and wherein the inclusion of sensors for the sole purpose of such operational determinations is likewise not desired. As such, the following descriptions should be taken by way of example and not by way of limitation.

Figure 1:
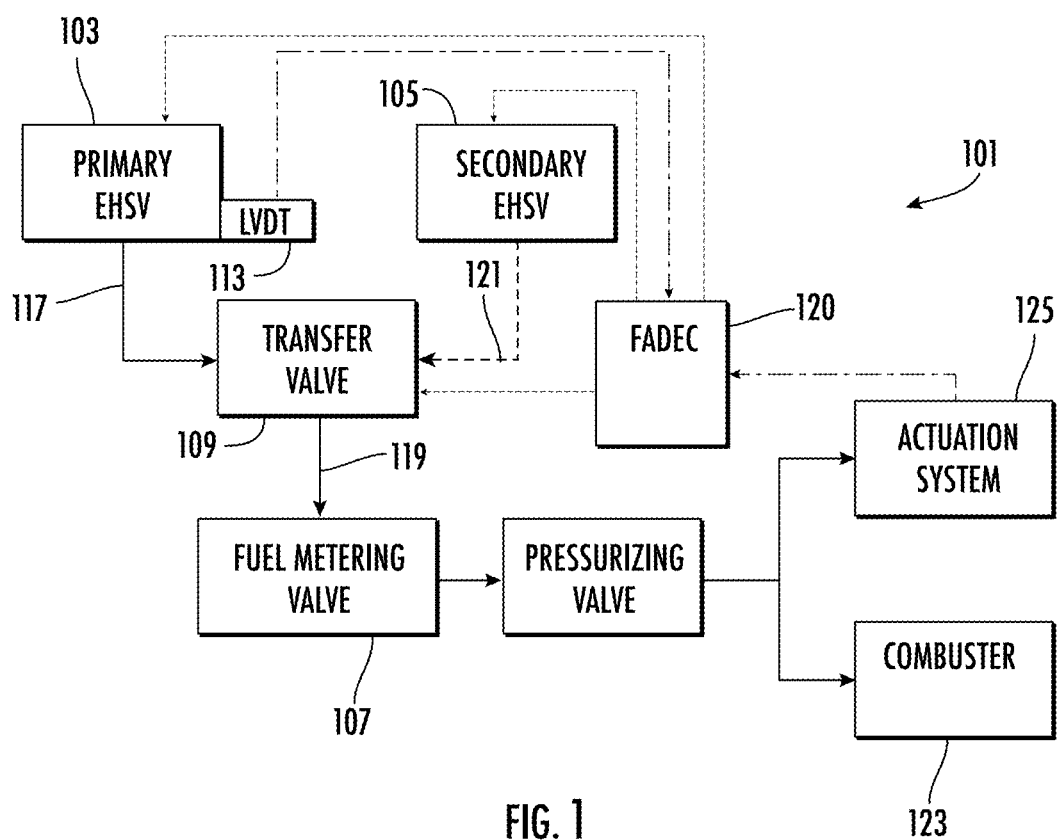
FIG. 1 is a simplified system level block diagram of a redundant fluid flow control system for aerospace applications constructed in accordance with an embodiment of the present invention and in which an embodiment of a method of the present invention is performed.

With reference now to FIG. 1, there is illustrated a fuel metering system 101 constructed in accordance with one embodiment of the present invention. In this illustrated embodiment the system 101 supplies pressurized fuel to the combustor 123 of the engine and to an actuation system 125 to provide hydraulic power to actuators/end effectors. The system 101 of this embodiment utilizes redundant electro-hydraulic servo valves (EHSVs) 103,105 for control of the fuel metering valve (FMV) 107 of the fuel metering unit (FMU). Because of the redundancy provided, the illustrated system 101 utilizes single coil EHSVs 103, 105 for the redundant control of the main FMV 107. During normal operation of the fuel metering system 101, the FADEC 120 monitors the position of the primary EHSV 103 with a position sensor, e.g. a linear variable differential transformer (LVDT) 113. However, as discussed briefly above, other considerations prohibit the inclusion of an LVDT for the secondary EHSV 105.

In order to provide redundancy of the fuel flow control, a transfer system including a transfer valve 109 is included to allow the FADEC 120 to select which of the two redundant EHSVs 103, 105 to use to control the FMV 107. In the event of a failure of the controlling, primary EHSV 103, the FADEC 120 can signal the transfer system to switch control via the transfer valve 107 to the secondary EHSV 105, thus maintaining control of the FMV 107. This will allow continued operation of both the fuel flow to the engine as well as to the control surface actuation system reliant thereon.

In FIG. 1 the transfer system, which utilizes a transfer valve 109, is positioned such that the control pressures from the primary EHSV 103 are supplied (shown via the solid line 117, 119) to position the main FMV 107. The control pressures from the redundant EHSV 105 (shown as the dashed line 121) are blocked from the main FMV 107 at the transfer valve 109. In the event of a failure of the primary EHSV 103, the FADEC 120 positions the transfer system such that the control pressures from the redundant EHSV 105 are supplied (via line 121, 119) to position the FMV 107. The control pressures from the primary EHSV 103 on line 117 are blocked from the main FMV 107 at the transfer valve 109.

Figure 2:
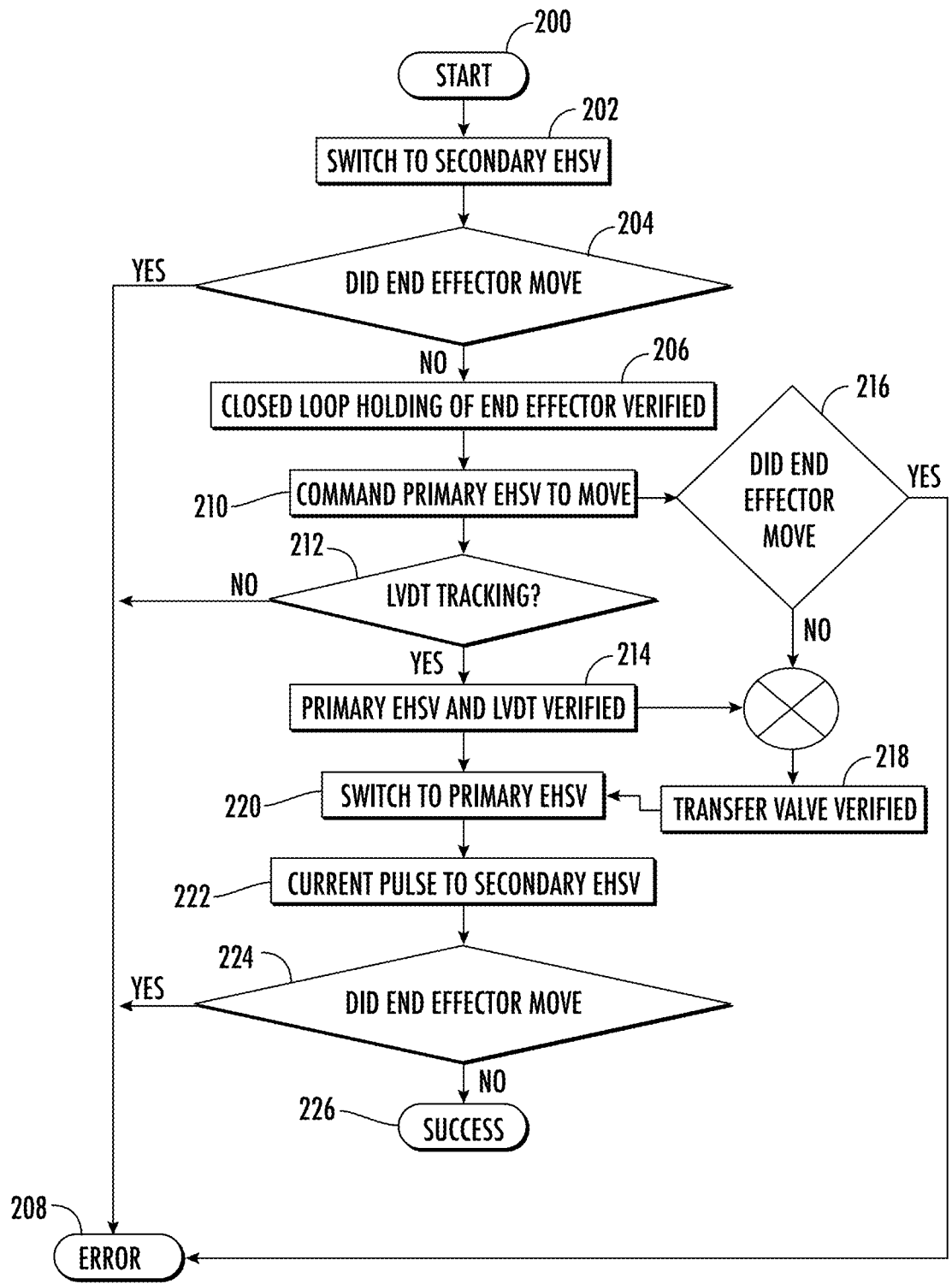
FIG. 2 is a process flow diagram illustrating an embodiment of an in situ method for preflight verification of the operational status of primary and back-up control components in a redundant fluid flow control system, such as shown in FIG. 1.

In order to ensure that the primary and secondary EHSVs 103, 105 are operational prior to deployment, e.g., upon initial system power up, without incurring an adverse system effect such as supplying fuel to the combustor or moving control surfaces, the FADEC 120 operates the in situ method of FIG. 2 to which attention is now directed. Once such method is completed, the FADEC 120 will have, without supplying fuel to the combustor or significantly moving an end effector, verified that: 1) the transfer valve 109 is operational (in one embodiment by observing minute position movements on the output of the actuation system to indicate transfer timing): 2) the primary control channel EHSV 103 is isolated from the outputs of the control manifold of the transfer valve 109: 3) the LVDT 113 and primary EHSV 103 are functioning properly: and 4) the backup channel EHSV 105 is functioning properly and is controlling the output position holding of the actuation system.

As illustrated in FIG. 2, in one embodiment of the BIT check method of the present invention, upon initiation 200, the FADEC 120 commands the transfer valve 109 to switch control to the backup EHSV 105 at step 202. The position of the actuator/end effector of the actuation system is then monitored at step 204 to determine if it experiences any movement. If no movement is observed, then the closed loop holding of the end effector is verified as operational at step 206. Otherwise, a failure of the EHSV 105 is identified, and the method terminates 208

After step 206, the FADEC 120 commands the primary EHSV 103 to move at step 210. The FADEC 120 then monitors the output of the LVDT 113 at step 212 to ensure it is tracking the commanded position. If the LVDT 113 is properly tracking the commanded position of the EHSV 103, then the EHSV 103 and its LVDT 113 are verified as operational at step 214. Otherwise, a failure of the EHSV 103 and/or its LVDT 113 is identified, and the method terminates 208.

During step 210, the position of the actuator/end effector of the actuation system is again monitored at step 216 to determine if it experiences any movement. If no movement is observed, then the functionality of the transfer valve 109 is verified at step 218 when step 214 indicates that the EHSV 103 is operational. Otherwise, a failure of the transfer valve 109 is identified, and the method terminates 208.

If the primary EHSV 103 and its LVDT 113, the secondary EHSV 105, and the transfer valve 109 are all confirmed as operational from the above steps, then the FADEC 120 commands the EHSV 103 back to its original position and switches the transfer valve 109 back to allow the primary EHSV 103 to control the FMV 107 at step 220.

After returning the primary control function to the primary EHSV 103 channel, a momentary step change in current from the FADEC 120 to the backup EHSV 105 is provided at step 222. The position of the end effector is monitored at step 224 for any position change that would indicate a failure of the transfer valve 109 to properly return to the primary mode. Any such movement at step 224 would indicate a failure of the transfer valve 109, and the method would terminate 208. Absent any such movement, the method would then successful conclude 226 indicating that all system components have been checked and are operational.

With an understanding of the exemplary embodiments discussed above for use in an engine fuel control system that also utilize the fuel to supply hydraulic pressure to a downstream actuation system 125, those skilled in the art will now appreciate the construction and operation of other embodiments of the present invention. For example, in another embodiment the redundant flow control system is utilized solely for an actuator and/or end effector for a control surface of an aircraft, a hydraulically actuated door, etc.

In such an embodiment, the fuel metering valve 107 is replaced with a hydraulic metering valve or actuator (each referred to as "metering valve" hereinafter) that drives the downstream system, e.g., a hydraulically actuated door, a control surface, etc. In this embodiment the metering valve opens and/or closes the door or moves the control surface under control of the hydraulic pressure supplied by the EHSVs, either directly or via a further downstream actuator or group of actuators. In such systems there would be no fuel pressuring valve or combustor 123 shown in FIG. 1, and the illustrated FADEC 120 may simply be a controller for the redundant hydraulic flow control system.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of in situ verification of operational status of control components in a redundant flow control system having a primary electro-hydraulic servo valve (EHSV) and a secondary EHSV coupled via a transfer valve to control a position of a metering valve supplying fluid flow to at least one downstream system, comprising the steps of:
commanding the transfer valve to couple the secondary EHSV to the metering valve;
determining if the at least one downstream system changed from a quiescent state after the step of commanding the transfer valve to couple the secondary EHSV to the metering valve;
when the step of determining if the at least one downstream system changed from the quiescent state is negative, commanding the primary EHSV to move;
determining if the primary EHSV moved after the step of commanding the primary EHSV to move;
when the step of determining if the primary EHSV moved is positive, commanding the transfer valve to couple the primary EHSV to the metering valve;
commanding the secondary EHSV to move;
determining if the at least one downstream system changed from the quiescent state after the step of commanding the secondary EHSV to move; and
when the step of determining if the at least one downstream system changed from the quiescent state after the step of commanding the secondary EHSV to move is negative, providing an indication of the operational status of the control components in the redundant flow control system.

2. The method of claim 1, further comprising the step of indicating a failure when the step of determining if the at least one downstream system changed from the quiescent state is positive.

3. The method of claim 1, further comprising the step of indicating a failure when the step of determining if the primary EHSV moved after the step of commanding the primary EHSV to move is negative.

4. The method of claim 1, further comprising the step of indicating a failure when the step of determining if the at least one downstream system changed from the quiescent state after the step of commanding the secondary EHSV to move is positive.

5. The method of claim 1, further comprising the steps of determining if the at least one downstream system changed from the quiescent state after the step of commanding the primary EHSV to move, and indicating a failure when the step of determining if the at least one downstream system changed from the quiescent state after the step of commanding the primary EHSV to move is positive.

6. The method of claim 5, wherein when the step of determining if the at least one downstream system changed from the quiescent state after the step of commanding the primary EHSV to move is negative and the step of determining if the primary EHSV moved after the step of commanding the primary EHSV to move is positive, verifying that the transfer valve is operational.

7. The method of claim 1, further comprising the step of verifying operation of a closed loop holding of a quiescent state of the at least one downstream system when the step of determining if the at least one downstream system changed from the quiescent state is negative.

8. The method of claim 1, further comprising the step of verifying operation of the primary EHSV and tracking of a position of the primary EHSV when the step of determining if the primary EHSV moved after the step of commanding the primary EHSV to move is positive.

9. The method of claim 1, further comprising the step of verifying operation of the transfer valve when the step of determining if the at least one downstream system changed from the quiescent state after the step of commanding the secondary EHSV to move is negative.

10. A redundant flow control system, comprising:
a plurality of control components including a primary electro-hydraulic servo valve (EHSV) and a secondary EHSV;
a metering valve supplying fluid flow to at least one downstream system;
a transfer valve configured to couple one of either the primary EHSV and the secondary EHSV to the metering valve to control a position thereof;
a controller configured to provide in situ verification of operational status of at least the control components; and
wherein the controller is configured to:
command the transfer valve to couple the secondary EHSV to the metering valve;
determine if the at least one downstream system changed from a quiescent state after commanding the transfer valve to couple the secondary EHSV to the metering valve;
when determining if the at least one downstream system changed from the quiescent state is negative, command the primary EHSV to move;
determine if the primary EHSV moved after commanding the primary EHSV to move;
when determining if the primary EHSV moved is positive, command the transfer valve to couple the primary EHSV to the metering valve;
command the secondary EHSV to move;
determine if the at least one downstream system changed from the quiescent state after commanding the secondary EHSV to move; and
when determining if the at least one downstream system changed from the quiescent state after commanding the secondary EHSV to move is negative, provide an indication of the operational status of the control components in the redundant flow control system.

11. A redundant flow control system, comprising:
a plurality of control components including a primary electro-hydraulic servo valve (EHSV) and a secondary EHSV;
a metering valve supplying fluid flow to at least one downstream system;
a transfer valve configured to couple one of either the primary EHSV and the secondary EHSV to the metering valve to control a position thereof;
a controller configured to provide in situ verification of operational status of at least the control components; and
wherein the controller is configured to indicate a failure when determining if the at least one downstream system changed from a quiescent state is positive.

12. A redundant flow control system, comprising:
a plurality of control components including a primary electro-hydraulic servo valve (EHSV) and a secondary EHSV;
a metering valve supplying fluid flow to at least one downstream system;
a transfer valve configured to couple one of either the primary EHSV and the secondary EHSV to the metering valve to control a position thereof;
a controller configured to provide in situ verification of operational status of at least the control components; and
wherein the controller is configured to indicate a failure when determining if the primary EHSV moved after commanding the primary EHSV to move is negative.

13. A redundant flow control system, comprising:
a plurality of control components including a primary electro-hydraulic servo valve (EHSV) and a secondary EHSV;
a metering valve supplying fluid flow to at least one downstream system;
a transfer valve configured to couple one of either the primary EHSV and the secondary EHSV to the metering valve to control a position thereof;
a controller configured to provide in situ verification of operational status of at least the control components; and
wherein the controller is configured to indicate a failure when determining if the at least one downstream system changed from a quiescent state after commanding the secondary EHSV to move is positive.

14. A redundant flow control system, comprising:
a plurality of control components including a primary electro-hydraulic servo valve (EHSV) and a secondary EHSV;
a metering valve supplying fluid flow to at least one downstream system;
a transfer valve configured to couple one of either the primary EHSV and the secondary EHSV to the metering valve to control a position thereof;
a controller configured to provide in situ verification of operational status of at least the control components; and
wherein the controller is configured to determine if the at least one downstream system changed from a quiescent state after commanding the primary EHSV to move, and to indicate a failure when determining if the at least one downstream system changed from the quiescent state after commanding the primary EHSV to move is positive.

15. The system of claim 14, wherein the controller is configured to verify that the transfer valve is operational after determining if the at least one downstream system changed from the quiescent state after commanding the primary EHSV to move is negative and determining if the primary EHSV moved after commanding the primary EHSV to move is positive.

16. A redundant flow control system, comprising:
a plurality of control components including a primary electro-hydraulic servo valve (EHSV) and a secondary EHSV;
a metering valve supplying fluid flow to at least one downstream system;
a transfer valve configured to couple one of either the primary EHSV and the secondary EHSV to the metering valve to control a position thereof;
a controller configured to provide in situ verification of operational status of at least the control components; and
wherein the controller is configured to verify operation of a closed loop holding of a quiescent state of the at least one downstream system when determining if the at least one downstream system changed from the quiescent state is negative.

17. A redundant flow control system, comprising:
a plurality of control components including a primary electro-hydraulic servo valve (EHSV) and a secondary EHSV;
a metering valve supplying fluid flow to at least one downstream system;
a transfer valve configured to couple one of either the primary EHSV and the secondary EHSV to the metering valve to control a position thereof;
a controller configured to provide in situ verification of operational status of at least the control components; and
wherein the controller is configured to verify operation of the primary EHSV and tracking of a position of the primary EHSV when determining if the primary EHSV moved after commanding the primary EHSV to move is positive.

18. A redundant flow control system, comprising:
a plurality of control components including a primary electro-hydraulic servo valve (EHSV) and a secondary EHSV;
a metering valve supplying fluid flow to at least one downstream system;
a transfer valve configured to couple one of either the primary EHSV and the secondary EHSV to the metering valve to control a position thereof;
a controller configured to provide in situ verification of operational status of at least the control components; and
wherein the controller is configured to verify operation of the transfer valve when determining if the at least one downstream system changed from a quiescent state after commanding the secondary EHSV to move is negative.

19. The redundant flow control system of claim 11, wherein the controller is further configured to:
command the transfer valve to couple the secondary EHSV to the metering valve; and
determine if the at least one downstream system changed from the quiescent state after commanding the transfer valve to couple the secondary EHSV to the metering valve.

20. The redundant flow control system of claim 12, wherein the controller is further configured to:
command the transfer valve to couple the secondary EHSV to the metering valve;
command the primary EHSV to move;
determine if the primary EHSV moved after commanding the primary EHSV to move.

21. The redundant flow control system of claim 13, wherein the controller is further configured to:
command the transfer valve to couple the primary EHSV to the metering valve;
command the secondary EHSV to move;
determine if the at least one downstream system changed from the quiescent state after commanding the secondary EHSV to move.

22. The redundant flow control system of claim 14, wherein the controller is further configured to:
command the transfer valve to couple the secondary EHSV to the metering valve; and
command the primary EHSV to move.

23. The redundant flow control system of claim 15, wherein the controller is further configured to determine if the primary EHSV moved after commanding the primary EHSV to move.

24. The redundant flow control system of claim 16, wherein the controller is further configured to:
command the transfer valve to couple the secondary EHSV to the metering valve; and
determine if the at least one downstream system changed from the quiescent state after commanding the transfer valve to couple the secondary EHSV to the metering valve.

25. The redundant flow control system of claim 17, wherein the controller is further configured to:
command the transfer valve to couple the secondary EHSV to the metering valve;
command the primary EHSV to move;
determine if the primary EHSV moved after commanding the primary EHSV to move.

26. The redundant flow control system of claim 18, wherein the controller is further configured to:
command the transfer valve to couple the primary EHSV to the metering valve;
command the secondary EHSV to move;
determine if the at least one downstream system changed from the quiescent state after commanding the secondary EHSV to move.

* * * * *